United States Patent [19]

Wahner

[11] Patent Number: 4,462,194
[45] Date of Patent: Jul. 31, 1984

[54] BUILDING PANEL WITH CANTILEVERED RETAINING MEMBERS

[75] Inventor: Clarence O. Wahner, Brown Deer, Wis.

[73] Assignee: Sprinkmann Sons Corporation, Milwaukee, Wis.

[21] Appl. No.: 403,950

[22] Filed: Jul. 30, 1982

[51] Int. Cl.³ .......................... E04C 1/00; E04B 5/00
[52] U.S. Cl. .................................. 52/309.11; 52/202; 52/410; 52/512; 411/82; 411/510
[58] Field of Search ............... 52/309.2, 309.9, 309.11, 52/410, 411, 412, 413, 414, 508, 512, 511, 202; 411/82, 107, 509, 510; 428/99

[56] References Cited

U.S. PATENT DOCUMENTS

| 1,673,630 | 6/1928 | Madge | 52/512 |
| 3,088,361 | 5/1963 | Hallock | 52/512 |
| 3,771,275 | 11/1973 | Seckerson | 52/508 |
| 4,162,597 | 7/1979 | Kelly | 52/410 |
| 4,232,496 | 11/1980 | Warkentin | 52/309.2 |
| 4,238,446 | 12/1980 | Tanaka | 411/510 |
| 4,288,951 | 9/1981 | Carlson et al. | 52/410 |
| 4,361,997 | 12/1982 | Decaro | 52/512 |

FOREIGN PATENT DOCUMENTS

WO80/00012 7/1980 PCT Int'l Appl. .
149203 11/1962 U.S.S.R. .................. 52/378

Primary Examiner—John E. Murtagh
Assistant Examiner—Andrew Joseph Rudy
Attorney, Agent, or Firm—Quarles & Brady

[57] ABSTRACT

A building panel (1) made with a first outer layer (2), an interior core (4) of foam material, and a second outer layer (5) including metal film. Retention members (3, 3') are attached to the first outer layer (2) and have retention elements (12, 12') that extend into the interior core (4).

4 Claims, 8 Drawing Figures

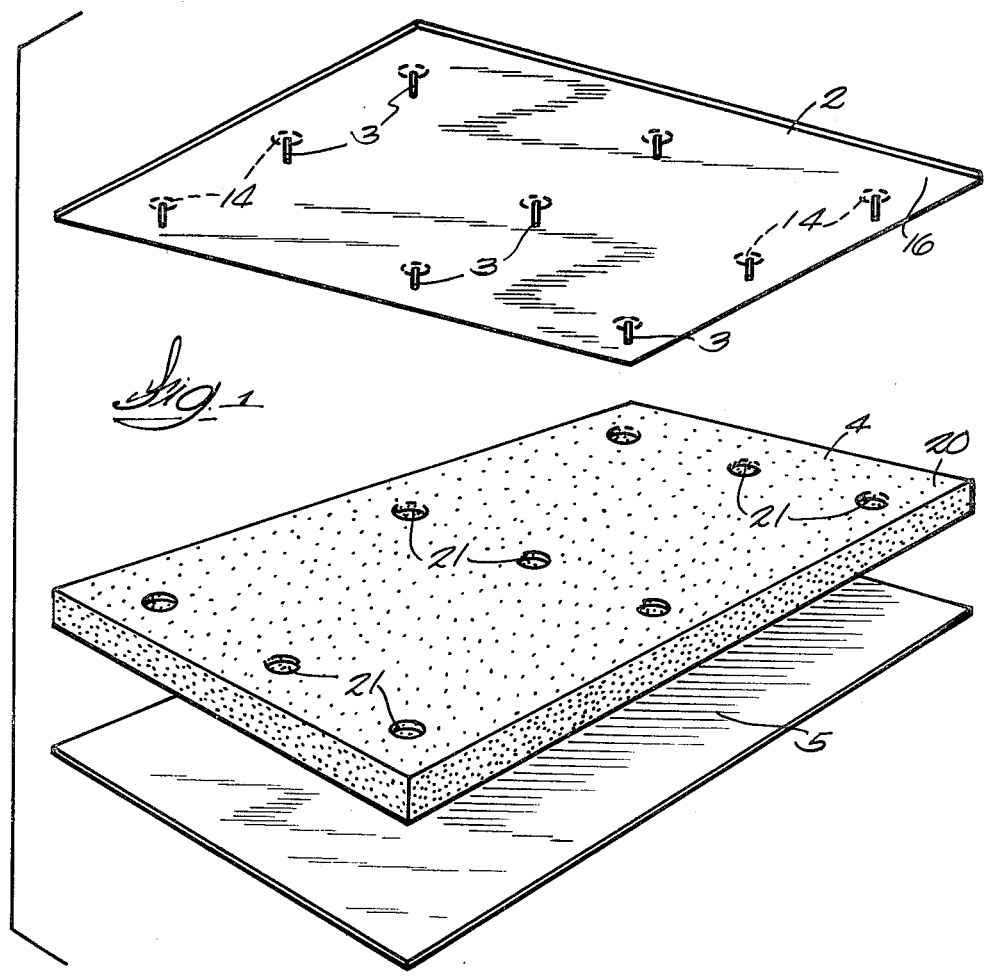
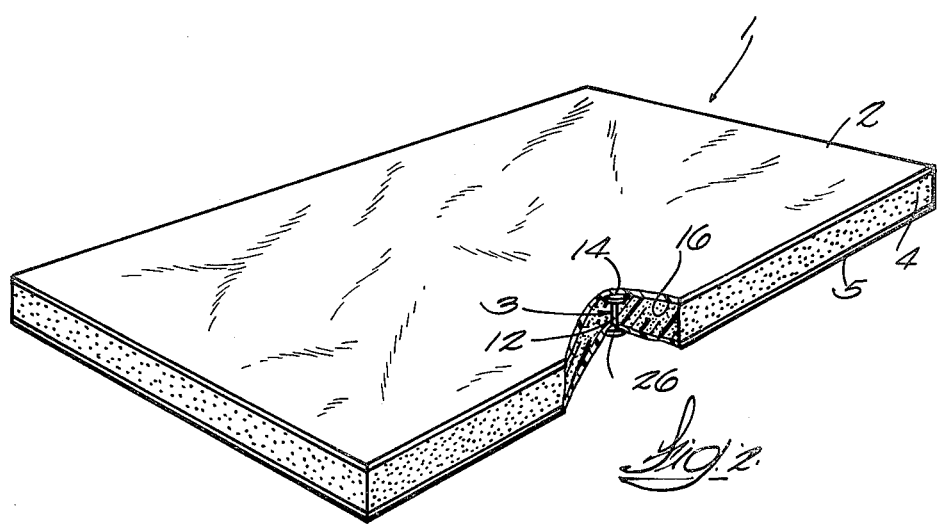

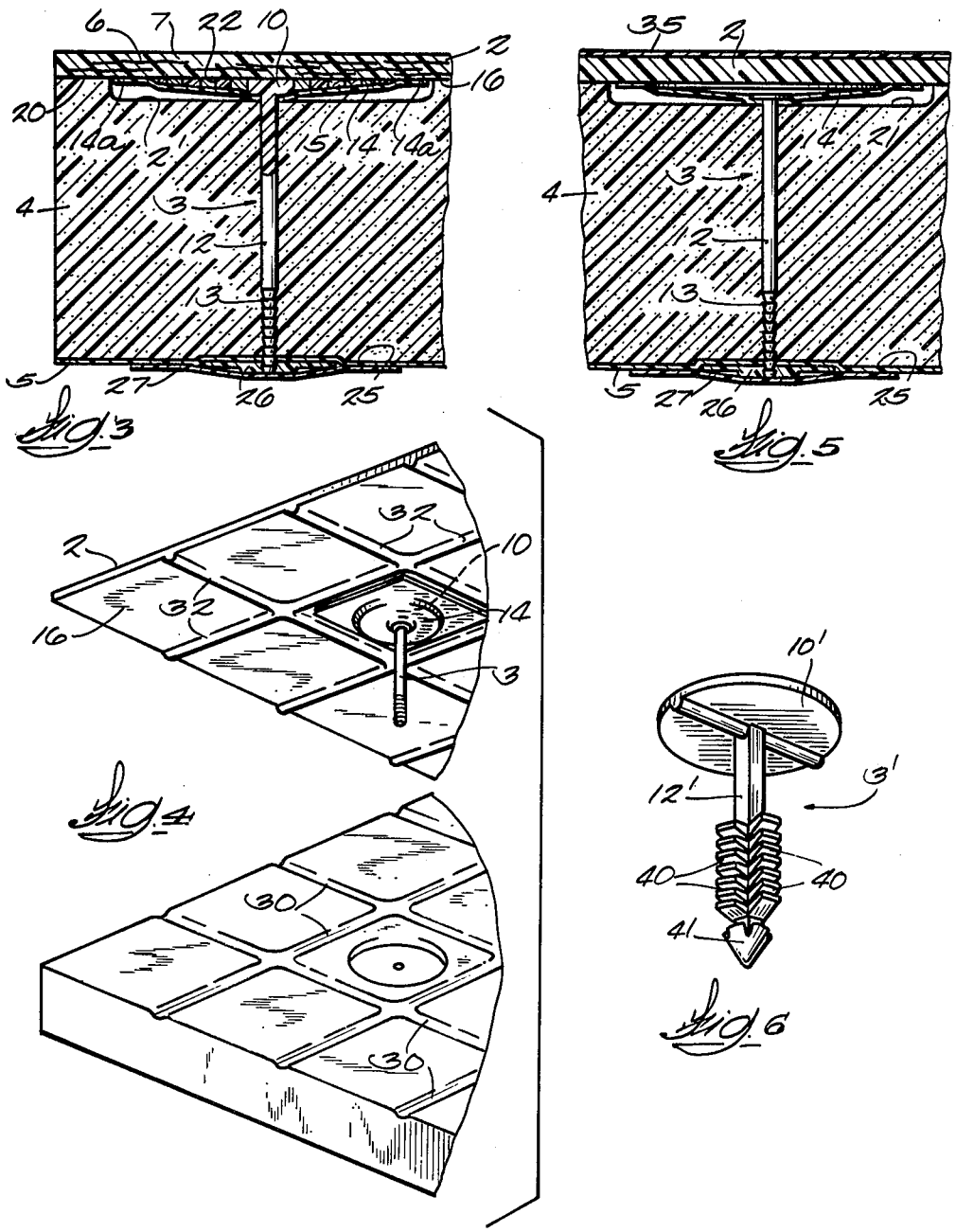

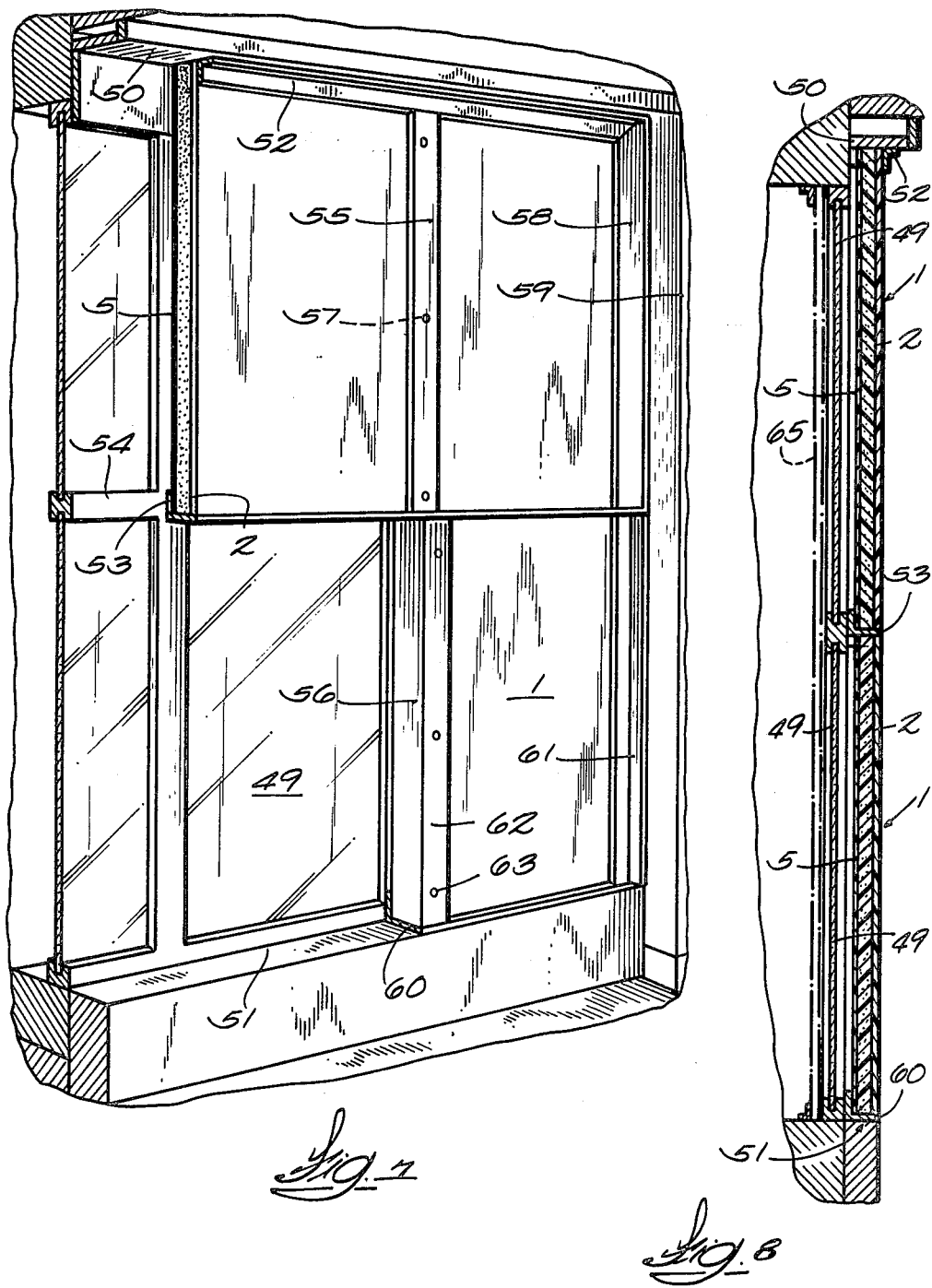

BUILDING PANEL WITH CANTILEVERED RETAINING MEMBERS

TECHNICAL FIELD

This invention relates to building panels suitable for installation on the exterior of buildings.

BACKGROUND ART

Several types of building panels are presently available that can be used on buildings such as schools, offices, factories and commercial and industrial buildings to cover exterior wall surfaces or window areas in order to reduce heat loss or modify the exterior appearance of the building. The assignee of this application and other companies have sold building panels for such uses which employed a pair of spaced outer layers of polyester resin reinforced with glass fiber material and having a core of plastic foam between the two layers. A more recent development particularly adapted for uses in which a highly fire resistant building panel is required is described in U.S. patent application Ser. No. 296,275 Reeves and Wahner, entitled "Building Panel" filed Aug. 26., 1981, owned by the assignee of this application, which discloses building panels that employ furan resins for the spaced outer layers and includes a covering layer adapted to protect and enhance the appearance of one of the outer layers.

The new building panel which is described hereinbelow differs from the foregoing panels in that it includes only one outer layer that is made with reinforced plastic resin; the other outer layer consists of a metal film which acts as a heat reflective surface. Further, as another distinguishing feature of the present novel building panel, cantilevered retention members are uniquely arranged in the panel and employed as a means of retaining a plastic foam core within the building panel. The general objects of the present invention are to provide building panels including the foregoing features; more specific objects will be apparent from the description which follows.

DISCLOSURE OF THE INVENTION

The building panels of the present invention include spaced first and second outer layers and an interior core of plastic foam material in which: (a) one of the outer layers is made of a suitable plastic resin reinforced with glass fiber material, (b) the other outer layer is a thin layer of heat reflective metal such as aluminum foil, and (c) retention members having rod-like retaining elements are supported from the outer layer that is made with reinforced plastic resin and cantilevered therefrom such that the rod-like retaining elements penetrate through the foam core so as to retain the core in position within the panel.

DESCRIPTION OF THE DRAWINGS

The present invention is described below in full and concise terms to enable any person skilled in the art of producing reinforced plastic building panels to understand and practice the invention, by reference to the following drawings, in which:

FIG. 1 is an exploded view of a building panel according to the present invention;

FIG. 2 is a perspective view of a building panel made with the elements illustrated in FIG. 1;

FIG. 3 is a vertical sectional view of the building panel of FIGS. 1 and 2;

FIG. 4 is a partial exploded view of another building panel of the present invention;

FIG. 5 is a sectional view similar to FIG. 3 of a modification of the building panels of FIGS. 1-4;

FIG. 6 is a perspective view of another form of retention member which may be used as part of the new building panels;

FIG. 7 is a perspective view of a typical installation of the present building panels on the exterior wall of a building; and FIG. 8 is a sectional view of the installation of FIG. 7.

BEST MODES FOR CARRYING OUT THE INVENTION (a) Description of FIGS. 1-3.

FIG. 1 is an exploded view of a building panel 1 of the present invention illustrating its principal elements consisting of a first outer layer 2, a plurality of core retention members 3, an interior core 4 of plastic foam material, and a second outer layer 5 of a thin film of metal foil. The layer 2 is bonded to one surface of the core 4 and the layer 5 is bonded to an opposite surface of the core to form a rigid composite panel which is shown in FIG. 2 in its final form.

The first outer layer 2 of the panel 1 is to comprise (see especially FIG. 3) a body of cured or hardened synthetic plastic resin 6 preferably reinforced with glass fiber material 7 or other suitable reinforcing materials to form a rigid panel element. Polyester resin and epoxy resins, of which many suitable types are well known in the art, can be employed as the plastic resin 6 of the layer 2. However, when the building panel is to be used under conditions in which a high degree of fire resistance is desired, furan resin can be employed as the resin component of the first layer; the term furan resins as used herein means homopolymers of furfuryl alcohol and copolymers of furfuryl alcohol with comonomers such as furfuraldehyde or formaldehyde. The reinforcing material 7 of the first layer 2 may be in the form of chopped fibers, continuous fibers, mat, cloth, woven rovings, unidirectional fibers, etc.

A core retention member 3 is illustrated in detail in the sectional view of FIG. 3. Each retention member 3 includes an enlarged flat plate 10, which is illustrated as being round in shape but may also be square or rectangular. Further, the plate of a retention member may include perforations 11 for the purpose discussed below. A rod-like retaining element 12 is connected to and extends from the plate 10 and is long enough to extend through the foam core 4 to the second outer layer 5 of the panel. The end portion 13 of the retaining element 12 may be serrated or toothed as illustrated in the drawing. Each retention member 3 is to be bonded to the first outer layer 2. For this purpose, a covering patch 14 of suitable reinforcing fabric material, such as fiberglass fabric or mat impregnated with the same resin used for the outer layer 2 extends over the surface 15 of the plate 10 which is remote from the inner surface 16 of the layer 2. The covering patch 14 is large enough to have peripheral or marginal portions 14a which contact the surface 16 of the layer 2. The plate 10 of a retention member is thus sandwiched between layer 2 and a covering patch 14, and the retaining element 12 thereof pierces or extends through the covering patch 14. The retention members may be made of plastic or metal, with plastic being the preferred material.

Returning now to FIG. 1, the surface 20 of the core 4 of plastic foam material which is to be bonded to the outer layer 2 includes a plurality of recesses 21. Each recess 21 is aligned with a core retention member 3, and there is one recess for each retention member. The purpose of the recesses 21 is best illustrated in the sectional view of FIG. 3. A recess 21 is deep enough, such as up to about ¼ inch deep, to accommodate a plate 10 of a retention member 3 and a covering patch 14 extending about the plate in such fashion that the surface 22 of the plate 10 of a retention member is approximately flush with the surface 16 of the layer 2 which is contacted by the foam core 4.

The interior core 4 can be of any suitable plastic or glass foam. A rigid closed cell polyurethane foam blown with a high molecular weight fluorocarbon gas (such as "Freon") is particularly effective. Other types of foam material may be employed, including polystyrene and polyethylene foams, glass foam, or phenolic or urea foams. Another especially useful foam material is glass fiber reinforced cellular isocyanurate foam which has closed cells. The material for the foam should be selected so as to impart insulation characteristics appropriate for the specific end use intended for the building panels, and it preferably should be able to bond with the plastic resin employed in the first layer 2 as the layer is being cured. The bond may be a chemical union or a mechanical bond, such as a cut surface, or both. Polyurethane plastic foam is preferred when a combination of low heat conductance and good fire resistance is required because it can be selected to have a low flame spread rating and a fuel contribution of zero when tested in accordance with ASTM E-84. The interior core 4 is most usefully in the form of pre-cut boards or blocks of plastic foam when the panel 1 is constructed because of better control over the finished product, although the material for the core may also be foamed-in-place.

The thickness of the interior core can vary in accordance with the thermal transmission characteristics desired for a particular panel, such as from less than 1 inch thick to eight to ten inches thick. For instance, closed cell polyurethane foam two inches thick will provide an R factor of about 13.4, and is suitable for many applications. (As used in this description, K factor refers to the number of BTUs conducted by material 1" thick per square foot per 1° F. temperature difference per hour; R is the reciprocal of K.) Thus the thickness of foam used in a particular building panel depends upon the resistance to heat conductance required for the specific end use contemplated for the panels.

The second outer layer 5 of the building panel 1 is a film of metal foil which is adhesively bonded to the surface 25 of the core 4 that is opposite to the core surface 20 which is bonded to the outer layer 2. The layer 5 is most usefully a thin layer of aluminum foil, which may be in the range of about 10 to 25 mils thick, and is to provide a heat reflective surface to the building panel. Aluminum foil of this type can be adhesively bonded to the surface 25 of the core. The aluminum foil metal layer also acts as a vapor barrier to both liquid water and water vapor; thus, in the normal installation of a building panel 1, the layer 5 will face towards the interior of a building. The outer layer 5 may also comprise a lamination of aluminum foil and paper, with the paper bonded to the surface 25 of the core and the aluminium foil as the outer surface.

The retaining element 12 of a retention member 3 has its end extending slightly through the metal layer 5 as illustrated in FIG. 3, and a washer 26 is inserted over this end of the retaining element and locked into engagement with the serrations on the end portion 13. The washer aids in holding the interior core 4 in the desired position. The washer 4 may be covered with a small piece of aluminum foil tape 27 coated with pressure sensitive adhesive in order to hold the washer in position.

The finished panel with the several layers joined together is illustrated in the perspective view of FIG. 2, with a portion broken away to show the manner in which a retention member 3 is joined to the interior surface 16 of the first outer layer 2 and cantilevered therefrom so that its retaining element 12 extends through the interior core 4 to hold the core in position within the panel structure. The building panel may be made in any desired size; when used as covering panels for the exterior walls of buildings, for example, a building panel 1 can be sized as needed to fit between exposed mullions, over windows, etc. Typical sizes for the building panels range from 1 ft. by 8 ft. to 4 ft. by 8 ft., although these dimensions can be varied as required. The spacing of the retention members 3 within the panel can also vary over wide limits; it has been found that spacing the retention members on 1 ft. centers is appropriate for most end uses of the building panel.

A useful method for manufacturing the building panel 1 is as follows. A board of foam material for the interior core 4, which preferably has aluminum foil adhesively bonded to one surface to provide the layer 5, is routed or otherwise processed to form the recesses 21 along its top surface 20 which is to be joined to the first outer layer 2. A coating of the plastic resin 6 to be used for the first outer layer 2 is applied over a suitable worktable. Next, one or more sheets of permeable glass fiber reinforcing material is set into the coating, and the glass fiber is saturated with plastic resin. Thereafter, one or more additional sheets of permeable glass fiber reinforcing material saturated with plastic resin are applied over the first sheet. After the desired thickness for the outer layer 2 has been built up in this fashion, which can typically be in the range of about ⅛ inch to ⅜ inch, the retention members 3 are set in position to correspond with the spacing of the recesses formed in the surface 21 of the core 4. The covering patches 14 of permeable glass fiber fabric saturated with the same plastic resin used for the layer 2 are then applied over the retaining element 12 of each retention member and placed in contact with the surface 15 of the plate 10 of each retention member; the covering patches 14 are large enough to have a peripheral portion extending beyond the plate of a retaining member so as to contact the layer 2. When the retention members are positioned in this fashion, plastic resin from the layer 2 and/or the covers 14 will fill all or most of the perforations 11 extending through the plate of a retention member. The interior core 4 is then placed in position and pushed downwardly so that its surface 21 is in good contact with the layer 2, during which action the retaining element 12 of each retention member pierces the core and extends slightly through the metal layer 5. Pressure is applied so that the core material will mate well with the reinforced laminate for the layer 2 that has been built up on the worktable. The washers 26, when used, are placed in position on the exposed end of each retention member. The assembly is then allowed to cure until the plastic resin is hardened. This forms a rigid panel in which the plastic resin of the layer 2 bonds, chemically or mechanically or both, with the core. The outer surface of the layer 2 can be painted if so desired, using a paint appropriate for adhering well to the plastic resin selected for the layer 2.

(b) Description of FIG. 4.

FIG. 4 illustrates an alternate construction for the building panel 1 designed to enhance the bonding between the first outer layer 2 and the interior core 4. The surface 20 of the core 4 is to be joined to the surface 16 of the first outer layer 2 as in the previous embodiment. Shallow intersecting longitudinal and transverse grooves 30 are cut into the surface 20 of the core using any suitable apparatus such as routing or milling equipment. The grooves can be rather shallow, with dimensions of about ⅛ inch deep by ⅛ inch wide being sufficient, although they can be up to about ½ inch wide by ½ inch deep or larger if so desired. The spacing between the grooves may be selected as desired, with grooves positioned on 3 inch centers being suitable for most applications of the building panel. When the panel is constructed according to the above-described method, the plastic resin of the layer 2 will flow into the grooves 30 during the set-up and curing steps. The layer 2 will have intersecting ribs 32 which are formed by the plastic resin flowing into the grooves 30. This provides an enhanced mechanical interlock between the first outer layer 2 and the core 4 so as to improve the mechanical bonding of these elements in addition to any chemical bonding which may occur between the plastic resin of the outer layer 2 and the core. In addition to the regular pattern of grooves 30 illustrated in FIG. 4, the grooves may be cut into the surface 20 of the core 4 in a random fashion in order to provide for mechanical interlock between the core and layer 2.

(c) Description of FIG. 5.

A modified version of the building panel 1 is illustrated in FIG. 5, which incorporates all the elements of the panel of FIGS. 1–3 but further includes an exterior layer 35 over the outer surface of the layer 2 of the panel. The exterior layer 35 is bonded to the outer surface of the layer 2 to provide a protective covering for the material of the layer 2. The layer 35 may have a smooth surface or a three-dimensional textured surface to provide decorative effect. The layer 35 may comprise a flexible sheet or film of synthetic plastic, such as polyester, acrylic or polyvinyl fluoride plastic. Further, the exterior layer 35 may also be a sheet of rigid thermoset plastic material such as melamine, phenolic or polyvinyl chloride. In general, the exterior layer can be in the range of from about 1 to 10 mils thick when a plastic film is used or up to about 30 mils thick when a thermoset sheet is used, although the exterior layer can be as thick as desired for a specific installation.

(d) Description of FIG. 6.

FIG. 6 illustrates another form of retention member that can be employed with the building panels described above. The retention member 3' includes an imperforate plate 10' from which extends a retaining element 12' which is square in cross-sectional shape. The lower end of retaining element 12' has four vertical rows of barbs 40, two rows of which are visible in the drawing, that extend outwardly from the retaining element 12'. The end of the retention member includes a conical tip 41. The tip 41 aids in penetration of the interior core 4 of foam material when a building panel is assembled using retention members 3'; the projecting barbs 40 aid in developing mechanical intergagement with the foam core. The retention members 3' are assembled in a building panel 1 in the same manner described above with respect to the retention members 3. If desired, a washer can be positioned about the end of the retention member 3' similar to the manner illustrated above in connection with the washer 26. The retention member 3' is preferably of plastic material, most desirably of a type which will bond with the resin employed for the outer layer 2 of a building panel.

(e) Description of FIGS. 7 and 8.

The building panels described above are useful as covering panels for application to the exterior walls of buildings. A typical installation is illustrated in FIGS. 7 and 8 wherein panels 1 are installed over some of the windows 49 in a curtain wall. The panels are secured in place between the head 50 and the sill 51 of the wall. Each panel 1 is installed with its outer layer 2 as the exposed exterior surface and its second outer layer 5 as the interior surface (i.e. facing towards the inside of the building) as best illustrated in FIG. 8. The two upper panels are held in position by a metal angle 52 (such as aluminum angle) secured along the head of the window and a metal angle 53 that is attached to the rail 54 of the wall structure. A metal batten 55 covers the abutting vertical edges of the two panels; the batten is secured to the mullion 56 of the wall with through fasteners 57. A metal angle 58 is secured to the column 59 of the wall to cover the edge of the panel butting against the column. The upper end of the lower panel butts against the angle 53, and the lower end butts against angle 60 that is fastened to the sill 51. Another angle 61 is attached to the column 59 along the butt joint between the panel and the column. The panel extends partly across the mullion 56, and angle 62 is attached into position by means of fasteners 63 that extend through one leg of the angle, the panel and into the mullion. The panels cover three of the four windows in the wall section illustrated in the FIG. 6. The remaining window 49 is left uncovered so that it may be used for ventilation or viewing. A gypsum board panel 65 may be installed on the inside of the windows to provide a thermal barrier when required by code, as shown in dashed line in FIG. 8.

The building panels 1 can be applied to a wall as described above to improve the energy efficiency of a building by reducing the amount of heat loss due to conduction, convection or radiation. At the same time, the panels can be installed over a wall so as to cover some of the existing windows but leave others uncovered for continued use if so desired.

INDUSTRIAL APPLICABILITY

The new building panels described herein are generally useful to cover exterior wall surfaces, although they also may be used as interior nonloadbearing partitions in buildings, such as to enclose rooms or define working spaces. Also, the building panels can be utilized as walls for a refrigerated or freezer area within a building, in which instance the panels may be made relatively thick to provide a high degree of insulation efficiency.

The new building panels have a number of useful advantages. The panels can be made to have high impact strength and good weatherability to be suitable for exterior use. They can be light in weight so as not to impose loadbearing problems on existing wall structues. The panels can reduce air infiltration into a building on which they are installed and also control moisture penetration; in addition, enclosing the windows in a building can reduce damage by vandalism. They may be used on both single story and multi story buildings. The present building panels require very little if any maintenance. The end user can be offered a wide choice of exterior colors and surface textures, so that the panels are compatible with a variety of architectural styles.

While the new panels have been described by reference to several specific examples, it is anticipated that those skilled in the art will be able to devise changes and modifications to the exemplary embodiments that will remain within the spirit and scope of the present invention.

I claim:

1. In a building panel having spaced first and second outer layers joined to opposed first and second surfaces, respectively, of an interior core of foam material, the first outer layer having an exposed surface and an inner surface joined to the first surface of the interior core, the improvement wherein:
   (1) the first outer layer is a layer of hardened plastic resin with reinforcing material embedded therein;
   (2) the interior core includes a plurality of spaced recesses along its first surface;
   (3) a plurality of retention members comprising a plate portion and a retention element extending from an inner surface of the plate portion are arranged within the building panel, with
      (a) the plate portion of each retention member abutting the inner surface of the first outer layer, and
      (b) the retention element of each retention member extending into the interior core;
   (4) a covering patch of reinforcing material extends about the plate portion of each retention member and includes a peripheral portion in contact with the inner surface of the first outer layer,
      (a) the covering patch being impregnated with plastic resin of the first outer layer and bonded thereto to secure the retention members to the first outer layer with their retention elements arranged at an angle to the first outer layer,
      (b) the plate portion of a retention member and a covering patch associated therewith being received in a recess along the first surface of the interior core such that the outer surface of the plate portion is approximately flush with the inner surface of the first outer layer; and
   (5) the second outer layer is a layer of heat reflective metal foil or heat reflective metal foil laminated to paper with the paper joined to the second surface of the interior core.

2. A building panel according to claim 1, wherein: grooves are defined along the first surface of the interior core, and the inner surface of the first outer layer includes ribs extending into the grooves.

3. A building panel according to claim 1 or 2, wherein: the plate portion of each retention member includes apertures filled with plastic resin of the first outer layer.

4. A building panel according to claim 1 or 2 further including: an exterior layer joined to the exposed surface of the first outer layer.

* * * * *